(12) United States Patent
Normann et al.

(10) Patent No.: US 7,017,403 B2
(45) Date of Patent: Mar. 28, 2006

(54) VEHICLE WHEEL COMPRISING A TIRE AND AN ASSEMBLY CONSISTING OF A VALVE A DEVICE FOR MEASURING THE TIRE PRESSURE AND A SPRING FOR HOLDING SAID DEVICE IN THE TIRE

(75) Inventors: Norbert Normann, Niefern-Öschelbronn (DE); Andreas Kühnle, Maulbronn (DE)

(73) Assignee: BERU Aktiengesellschaft, Ludwigsburg (DE)

(*) Notice: Subject to any disclaimer, the term of this patent is extended or adjusted under 35 U.S.C. 154(b) by 49 days.

(21) Appl. No.: 10/482,446

(22) PCT Filed: Jun. 25, 2002

(86) PCT No.: PCT/EP02/06985

§ 371 (c)(1),
(2), (4) Date: Dec. 23, 2003

(87) PCT Pub. No.: WO03/002360

PCT Pub. Date: Jan. 9, 2003

(65) Prior Publication Data

US 2004/0206169 A1    Oct. 21, 2004

(30) Foreign Application Priority Data

Jun. 26, 2001  (DE) ................................ 101 31 411

(51) Int. Cl.
*B60C 23/02* (2006.01)
(52) U.S. Cl. .................................. 73/146.2; 152/152.1
(58) Field of Classification Search ............... 73/146.2, 73/146.3; 152/152.1, 151, 516
See application file for complete search history.

(56) References Cited

U.S. PATENT DOCUMENTS

| | | | |
|---|---|---|---|
| 5,637,926 A | | 6/1997 | Zedonis |
| 5,637,928 A | * | 6/1997 | Nakajima et al. .......... 307/10.2 |
| 2001/0030601 A1 | * | 10/2001 | Nigon et al. ................ 340/445 |
| 2004/0084121 A1 | * | 5/2004 | Naito ....................... 152/152.1 |
| 2004/0089389 A1 | * | 5/2004 | Naito ......................... 152/516 |
| 2004/0112489 A1 | * | 6/2004 | Imbert ........................ 152/151 |
| 2004/0183658 A1 | * | 9/2004 | Yamagiwa et al. ......... 340/427 |
| 2005/0072224 A1 | * | 4/2005 | Huang ....................... 73/146.3 |

OTHER PUBLICATIONS

DE 196 26 145 A (Continental AG) Jan. 8, 1998 EP 0 751 017 A (Alligator Ventilfab GmbH) Jan. 2, 1997.
WO 01/76894 A1 (TRW France SA) filed Apr. 6, 2001.

* cited by examiner

*Primary Examiner*—Edward Lefkowitz
*Assistant Examiner*—Andre Allen
(74) *Attorney, Agent, or Firm*—Orum & Roth LLC

(57) ABSTRACT

An arrangement having a device for measuring the tire pressure in a pneumatic tire, wich device is enclosed in a casing which is located inside the pneumatic tire when the pneumatic tire has been mounted on a wheel and also having spring acting resiliently upon the casing and a holder for the spring, which is to be fixed to the wheel. According to the invention, the spring and the casing are so designed and adapted one to the other that the casing finds support on the holder and is clamped for this purpose between the spring and the holder.

25 Claims, 5 Drawing Sheets

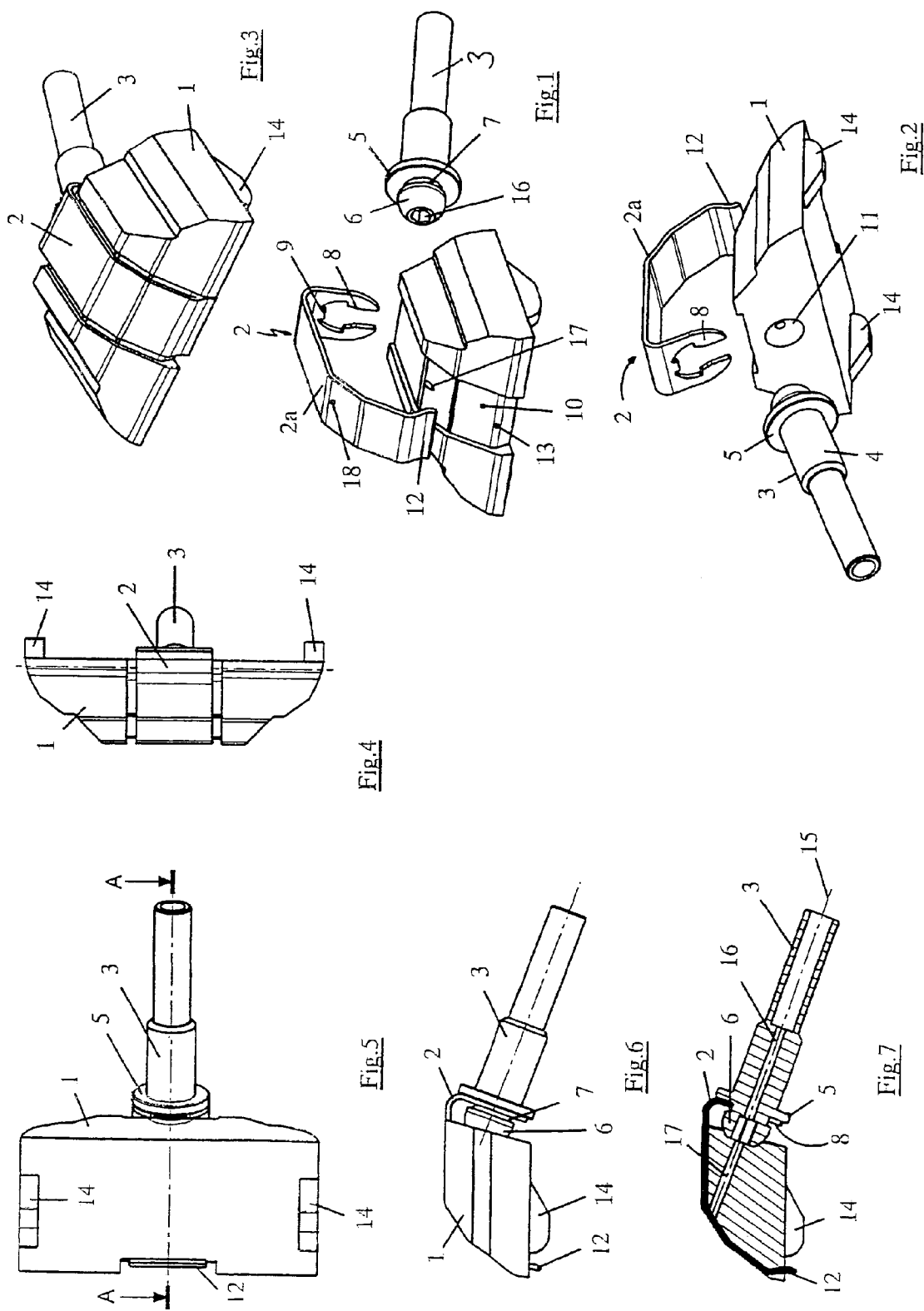

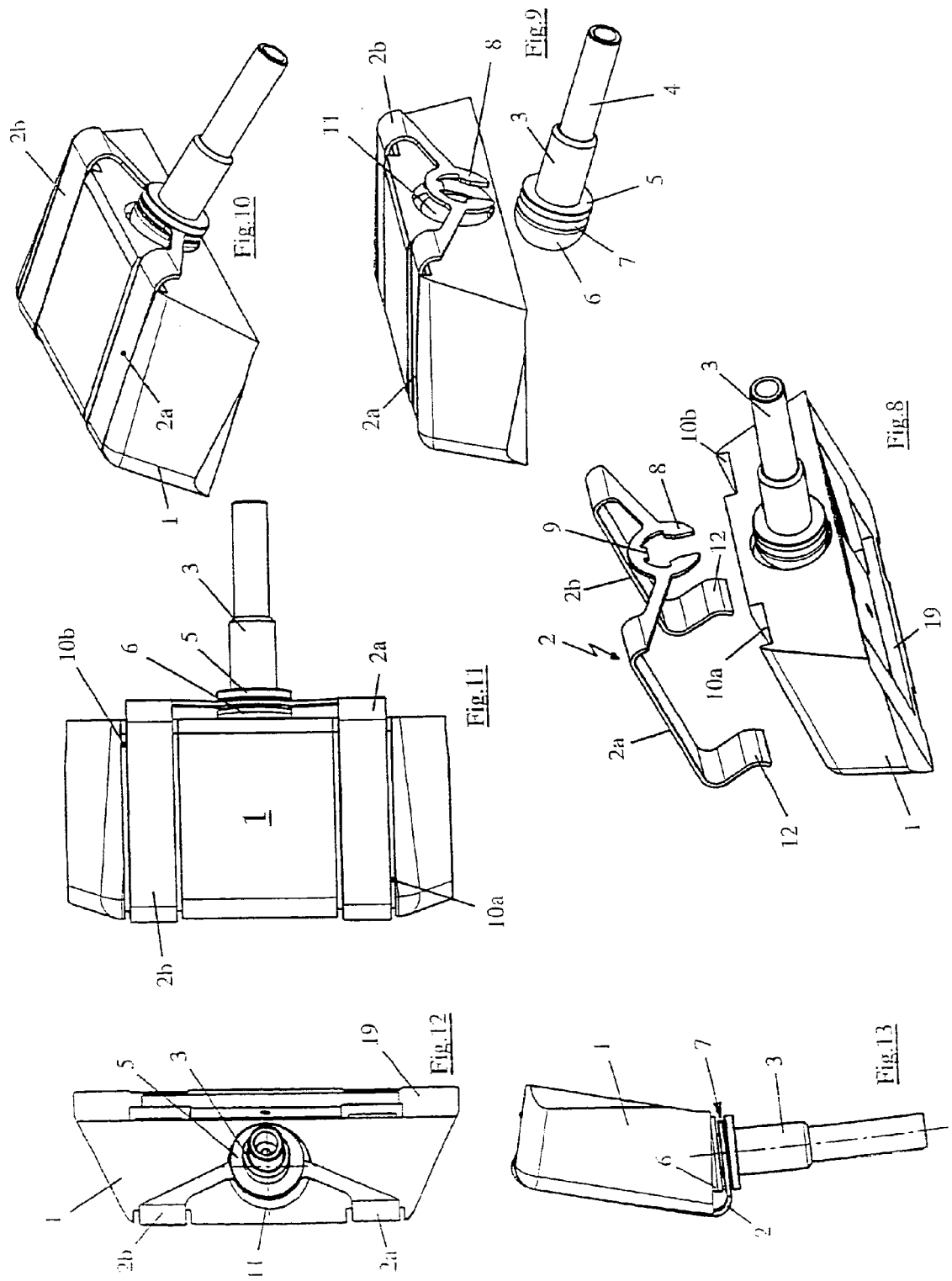

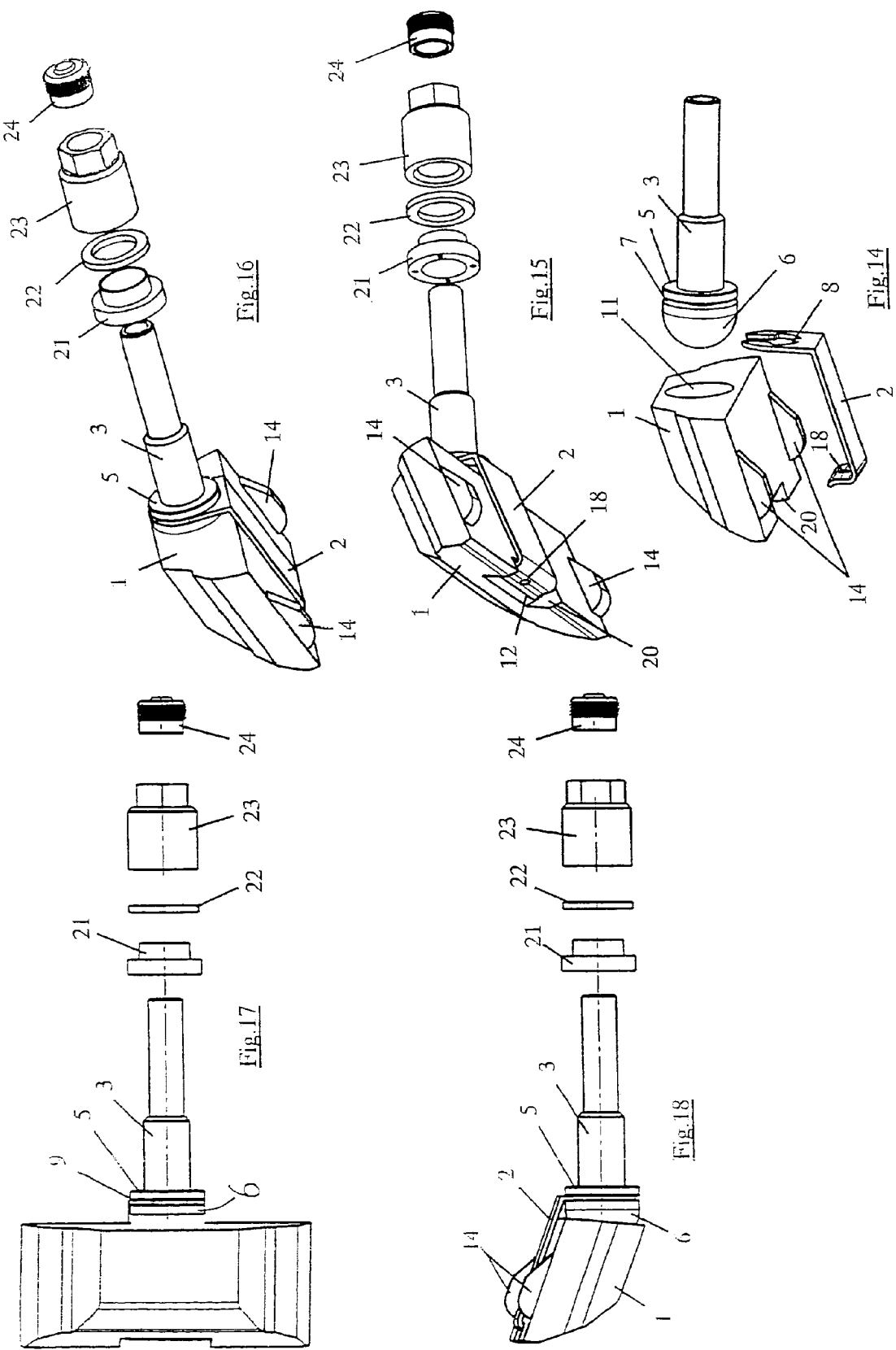

VEHICLE WHEEL COMPRISING A TIRE AND AN ASSEMBLY CONSISTING OF A VALVE A DEVICE FOR MEASURING THE TIRE PRESSURE AND A SPRING FOR HOLDING SAID DEVICE IN THE TIRE

The present invention relates to an arrangement having the features set out in the preamble of claim 1, and to a wheel having the features set out in the preamble of claim 15.

A wheel for motor vehicles equipped with pneumatic tyres, where the casing of a tyre pressure measuring device is firmly connected with the base of the valve by screwing, has been known from EP 0 751 017 B1. The valve bore, through which air can be pumped into the tyre, is provided with a threaded bore for this purpose, and the casing of the tyre pressure measuring device is provided with an oblong hole through which a hollow screw can be screwed into the thread of the valve bore. The screw is firmly tightened so as to fix the casing on the valve base. For this purpose, the valve is made from metal and has a calotte-like outer shape which allows it to be snugly seated in a recess of complementary calotte-like shape in the casing of the tyre pressure measuring device. In order to permit the casing to find support on the rim well, the casing is provided with two feet serving to support it on the rim well. In order to ensure that the feet will actually reach the rim well even with differently shaped rims, the oblong hole permits the casing to be fixed on the valve base in different orientations relative to the longitudinal axis of the valve bore. This design allows one and the same casing of the tyre pressure measuring device to be firmly mounted in wheels with differently shaped rims. It is, however, a disadvantage that for mounting the casing of the tyre pressure measuring device one needs an especially adapted valve whose valve bore in the valve base is configured as a threaded bore and is adapted to receive a bored special screw by means of which the casing can be screwed down on the valve base. Such a bored special screw is expensive. In addition, the casing of the tyre pressure measuring device must be provided with a deep indentation in order to permit the screw to be introduced through the oblong hole and to be screwed into the valve base using a screw driver. The deep indentation in the casing restricts, however, the inner space of the casing and divides it into two compartments, which limits the free arrangement of the electric and electronic components in the casing.

An arrangement having the features of the preamble of claim 1, and a wheel having the features of the preamble of claim 20 has been known from DE 196 26 145 A1. In the case of this known wheel, instead of screwing the casing of the tyre pressure measuring device onto the valve base, a spring is used whose free end acts upon the casing so as to clamp the casing between the free end of the spring and the vehicle rim in such a way that the casing will be supported, on the one hand, on the base of the rim well and, on the other hand, on two supporting points on the sidewall of the rim well. The spring therefore urges the casing against both the base of the rim well and the sidewall of the rim well so that the casing is embraced on four sides, namely by the spring on two sides, by the rim well on one side and by the sidewall of the rim well on one side. It is a disadvantage of that arrangement that just as in the case of the arrangement described by EP 0 751 017 B1, an expensive bored special screw is required in this case for mounting the spring on the valve base. Further, it is a disadvantage that differently shaped springs are required for differently shaped rims in order to urge the casing against, and to fix it on the rim.

Now, it is the object of the present invention to open up a way of mounting a casing with a tyre pressure measuring device on different rims for wheels with pneumatic tyres, at reduced cost and in a more universal way.

This object is achieved by an arrangement having the features set out in claim 1 and by a wheel having the features set out in claim 20. Advantageous further developments of the invention are the subject-matter of the sub-claims.

The arrangement according to the invention provides that the casing containing the tyre pressure measuring device, the spring acting resiliently upon the casing, and the spring holder fixed on the wheel are so designed and adapted one to the other that the casing finds support on the holder, and is clamped for this purpose between the spring and the holder. Contrary to the arrangement known from DE 196 26 145 A1, the holder not only holds the spring but serves an additional function in combination with the spring, namely the function of a support for the casing containing the tyre pressure measuring device. In this respect, the casing, the holder and the spring coact in a very special way in that the casing is clamped between the spring and the holder. This distinguishes the arrangement essentially from the subject-matter of DE 196 145 A1: While in the latter case, the spring acts exclusively to press the casing against the rim, i.e. against the rim well and against the sidewall of the rim which delimits the rim well, the spring according to the invention acts to urge the casing against the spring holder. This provides a universal way of mounting the casing on any type of rim because the points of engagement between which the casing is clamped, being defined by the holder and the spring, can be associated one to the other irrespectively of the particular rim used. In addition, a pre-assembled unit can be formed from the holder, the casing and the tyre pressure measuring device and the spring, which can then be handled as a unit and mounted as a unit on the rim.

The holder may be the base of a valve through which the pneumatic tyre is to be inflated. This solution is preferred for well-base rims, which are common in passenger cars. In the case of well-base rims, the valve is seated in a hole in the sidewall of the rim, that delimits the well base, and has its longitudinal axis extending at an angle relative to a vertical line. In the case of such an arrangement, the valve base, located inside the pneumatic tyre, is particularly well suited for supporting the casing of the tyre pressure measuring device. When the spring is mounted on the valve base as well, which is the case in the arrangement according to the invention, so that the casing can be clamped between the valve base and the spring, then one can do without an expensive special screw of the kind needed in the mounting arrangement according to EP 0 751 017 B1. And if no bored screw is needed, there is also no need to provide an indentation in the casing to allow such a screw to be fitted. Instead, the casing can be designed without giving consideration to any severe restrictions resulting from the mounting technique.

In the case of trucks, where the valve is usually seated radially in a hole in the flat base of a flat-base rim, the valve base, being located inside the pneumatic tyre, is less suited for holding the spring and supporting the casing of the tyre pressure measuring device. In the case of a flat-base rim, one therefore preferably uses a separate holder, which is fastened on the rim using a tightening strap embracing the rim well. Tightening straps are known in the field of installation engineering. With such tightening straps, any changes to the rim and any soldering work on the rim, that may otherwise be necessary for mounting the holder, are rendered superfluous. The strap may consist of a plastic material or of metal. Preferably, metallic tightening straps are used. The holder for the spring may in that case consist of a sheet-metal part, which can be produced at low cost by punching, bending and stamping operations. Such a holder preferably comprises a first part in contact with the rim well and a second part projecting from the rim well, on which the casing finds support in the clamped condition. The orientation and contour of the second part, which projects from the rim well, are preferably selected to be identical or similar to the orientation and contour of the valve base for a well-base rim. It can thus be ensured that the tyre pressure measuring device can be mounted in flat-base rims with the same casing as in well-base rims.

In order to permit the holder to be fixed in a flat-base rim in an especially safe way, its first part, which is in contact with the rim well, may preferably be formed as a double loop through which the tightening strap is passed.

It is an essential feature of the invention that the casing is supported on the housing and is clamped between the spring and the holder. This does not, however, exclude that the casing may be additionally supported on the rim. In fact, this is even preferred in order to give the casing a more stable position. The spring is, therefore, preferably designed and arranged so as to push or pull the casing additionally against the rim well. When the spring pushes the casing against the rim well, then it is arranged above the casing and is pre-shaped and mounted on the holder in such a way that the casing can be positioned below the spring only when the spring is bent away from the rim well, whereby the spring is biased. In contrast, when the casing is pulled against the rim well, then the spring is arranged below the casing and is biased into contact with the rim well. In both cases, however, there is no need for the casing to be supported on a sidewall of the rim delimiting the rim well, the casing being already supported on the holder.

Being clamped between the spring and its holder, the casing is in any case held by the spring action. Preferably, it is held between the holder and the spring not only by the spring action, but is held also positively, i.e. by form-locking means, in order to be absolutely sure that the casing cannot move out of its holder. The casing is provided for this purpose with a recess intended to receive a portion of the holder. A holder having a convex shaped end, especially in the form of a calotte, is particularly well suited. In this case, the casing should be provided with a concave recess matching the convex end of the holder, for receiving the convex end of the spring. This allows not only a positive and a spring action engagement of the holder in the casing, but also an automatic centering and an automatic alignment of the casing in the position best suited for fixing it.

Conveniently, the spring is a leaf spring. The form of such a leaf spring can be adapted to the contour of the casing with special ease, can then easily embrace the casing, and is capable of generating sufficient spring power.

The spring can be held on the holder in different ways. It may be connected with the holder by screwing or by a self-substance connection. It can also be positively connected with the holder, in which case the holder can be provided with an annular groove which can be engaged by a fork provided on the spring. In this case, the fork may even engage the holder loosely, provided it is urged into the annular groove of the holder by the spring tension prevailing in the spring after the spring has been mounted on the casing. There is, however, also the possibility to screw a screw into that end of the holder on which the casing is supported, and to clamp one end of the spring, which is provided with a hole, between the head of the screw and the end of the holder. The screw required for this purpose needs not be a bored special screw—as required in the prior art—but may be a cheep standard screw.

Positive engagement is of advantage not only between the casing and the holder, but also between the casing and the spring. The spring is, therefore, preferably provided with a stirrup, which receives the casing in centrally arranged receiving means, especially in a shallow groove, which is particularly well suited for receiving a leaf spring. While this simple arrangement is suited to prevent the casing from getting displaced, the depth of the groove may be so small that it has no practical effect on the free inner volume of the casing. In order to keep any tilting moments as small as possible, the casing should be mirror-symmetrical relative to its central receiving means, which is preferably configured as a shallow groove.

Even better retention for the spring is achieved by the use of a spring comprising two mutually parallel stirrups with a common connecting element by means of which the spring can be mounted on the holder. This connecting element may consist of an eye or a fork, for example. For mounting the two parallel stirrups, the casing is in this case provided with two parallel receiving means, for example two shallow grooves, conveniently arranged in symmetry relative to the centre plane of the casing that contains a longitudinal axis of the holder, for example the longitudinal axis of a valve. Any tilting moments that may be produced by rotation of the wheel when the vehicle is moving, can be optimally controlled in this way.

For supporting the casing on the rim well, the underside of the casing is conveniently provided with two projecting feet located on different sides of the centre plane of the casing. One thus achieves a stable three-point support for the casing, with two supporting points on the rim well and a third supporting point on the holder on which the casing is located by the spring.

In cases where the base of a valve is used as a holder for the spring and as support for the casing, the casing preferably is traversed by an air flow channel with the valve opening into that channel. The air flow channel needs not, however, to have a large cross-section so that it will not substantially reduce or restrict the inner space of the casing.

Certain advantageous embodiments of the invention are illustrated diagrammatically in the attached drawings in which identical parts, or parts corresponding one to the other, are identified by the same reference numerals. In the drawings:

FIG. 1 shows an isometric, exploded view of a first embodiment of an arrangement comprising a casing for a tyre pressure measuring device, a spring and a valve;

FIG. 2 shows an isometric view of the arrangement of FIG. 1, viewed at a different angle;

FIG. 3 shows an isometric view of the arrangement of FIG. 1 after assembly;

FIG. 4 shows an elevation of the arrangement of FIG. 3;

FIG. 5 shows a bottom view of the arrangement of FIG. 3;

FIG. 6 shows a different elevation of the arrangement of FIG. 3;

FIG. 7 shows a section along line A—A in FIG. 5;

FIG. 8 shows an isometric, exploded view of a second embodiment of an arrangement comprising a casing for a tyre pressure measuring device, a spring and a valve;

FIG. 9 shows an isometric view of the arrangement of FIG. 8 in a partly assembled state;

FIG. 10 shows an isometric view of the arrangement of FIG. 8 in the completely assembled state;

FIG. 11 shows a top view of the arrangement of FIG. 10;

FIG. 12 shows a front view of the arrangement of FIG. 10;

FIG. 13 shows an elevation of the arrangement of FIG. 10;

FIG. 14 shows an isometric, exploded view of a third embodiment of an arrangement comprising a casing for a tyre pressure measuring device, a spring and a valve;

FIG. 15 shows an isometric view of the arrangement of FIG. 14, in the completely assembled state, with additional parts for assembly and completion of the valve;

FIG. 16 shows another isometric view of the arrangement of FIG. 15;

FIG. 17 shows a top view of the arrangement of FIG. 15;

FIG. 18 shows an elevation of the arrangement of FIG. 15;

Figure 19:
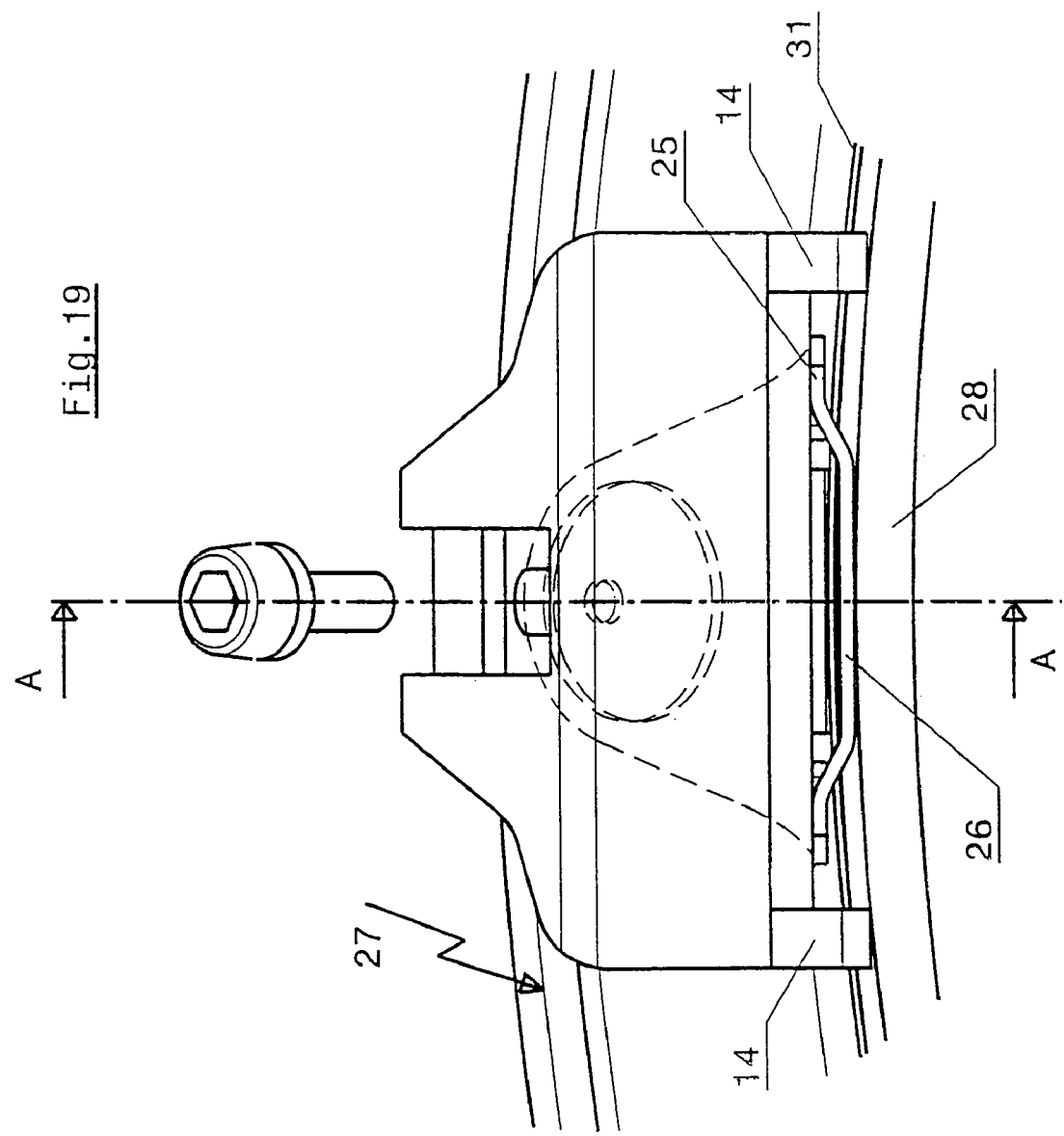
FIG. 19 shows an elevation of a fourth embodiment of an arrangement comprising a casing for a tyre pressure measuring device, a spring and a holder for such device, where the holder is fixed on the rim by a tightening strap.

The arrangement illustrated in FIGS. 1 to 7 comprises a casing 1, a spring 2 and a valve 3 serving as holder for the spring 2. The valve 3 comprises a shaft 4, which is inserted from the inside into a hole of a rim provided—in the case of a well-base rim—in that sidewall of the rim which delimits the well base. The valve 3 is inserted into the hole in the rim until its collar 5 abuts against the rim, and is then screwed down on the rim from the outside using the mounting means illustrated in FIGS. 15 to 18. After the valve 3 has been mounted on the vehicle wheel, the collar 5 and a valve base 6, having a calotte-shaped surface, are located in the pneumatic tyre. Between the collar 5 and the calotte of the valve base 6, there is provided an annular groove 7, which is engaged by a fork 8 provided on one end of a spring 2, which latter is designed as a leaf spring. A centering nose 9, provided on the spring 2 between the two prongs of the fork 8, ensures that the fork 8 occupies a predetermined position in the annular groove 7, by engaging a recess in the bottom of the groove 7 not visible in the drawing.

The spring 2 is repeatedly bent off to assume a roughly C-shaped configuration. It is, consequently, capable of encompassing the casing from its top. For this purpose, the casing 1 is provided with a shallow groove 10 on its upper surface and on the side facing away from the valve 3. The shape of the groove 10 and the shape of the spring 2 are matched one to the other so that a stirrup 2a of the spring 2, following the fork 8, can engage the groove 10 in a positive engagement and, simultaneously, in an engagement under spring action.

As seat for the spherical valve base 6, the casing 1 is provided on its side facing the valve 3 with a corresponding recess 11, shaped as a complementary calotte matching the valve base 6.

For mounting the arrangement, one first places the recess 11 of the casing 1 against the valve base 6, then inserts the spring 2 with its fork 8 into the annular groove 7 and pushes the opposite end 12 of the spring from the top into the shallow groove 10 until its forward end 12 overcomes a snap-in edge 13 formed in the shallow groove 10 and gets caught behind the snap-in edge 13, thereby forming a moderate undercut. The dimensions of the spring 2 are matched to the dimensions of the casing 1 so that the spring 2 necessarily has to bend resiliently outwards when being snapped onto the casing. This then has the result that the end 12 of the spring 2 urges the casing 1 against the valve base 6 so that the casing 1 is supported on the latter. The casing 1, the valve 3 and the spring 2 now form an assembled unit.

For supporting the casing 1 on the rim well, the underside of the casing is additionally provided with two feet 14 located near two lateral edges of the casing 1, at the greatest possible spacing one from the other. Together with the valve base 6 they constitute a stable three-point support for the casing 1 in the pneumatic tyre of the wheel. In this respect, interaction between the calotte-shaped surfaces of the valve base 6 and the recess 11 ensures automatic centering of the casing 1 in its most stable position possible.

After pre-assembly of the arrangement, as illustrated in FIGS. 3 to 7, it can be mounted on the rim of the wheel by inserting the valve 3, with its shaft 4, through a hole in the rim provided for this purpose and by screwing it down from the outside. It is ensured in this connection by the corresponding shape of the spring 2 that the feet 14 of the casing 1 are constantly pressed onto the rim well, which is guaranteed above all by the bent-off arrangement of the fork 8 relative to the remaining spring 2.

The valve 3 includes a channel 16, which passes through the valve in the direction of its longitudinal axis 15 and ends at the position of the valve base 6. In order to permit the air, which flows through the channel 16 when the tyre is being inflated, to flow through the valve a flow channel 17, starting out from the recess 11 and traversing the casing 1, is provided in the casing 1 in alignment with the axis 15. At the opposite side, where the flow channel 17 comes to light again, it is covered by the spring 2. In order to nevertheless permit the air to flow out, the spring is provided with a hole 18 at this point. Alternatively, the spring 2 could also be conveniently shaped at this point to provide an air gap between the spring 2 and the groove 10.

The second embodiment, illustrated in FIGS. 8 to 13, differs from the embodiment illustrated in FIGS. 1 to 7 insofar as the spring 2 is provided with two mutually parallel stirrups 2a and 2b connected via the fork 8. Accordingly, the upper surface of the casing 1 is provided with two mutually parallel grooves 10a and 10b intended to receive the two stirrups 2a and 2b of the spring. The underside of the casing is provided in this case with a projecting edge 19, instead of the two feet 14.

The third embodiment, illustrated in FIGS. 14 to 18, differs from the first embodiment illustrated in FIGS. 1 to 7 insofar as the spring 2 embraces the casing 1 about its bottom rather than about its top. Accordingly, there is no shallow groove on the upper surface of the casing 1. Nor is a groove provided on the underside of the casing 1, where the spring 2 extends between the two feet 14. The forward bent-off end 12 of the spring 2 snaps into a recess 20, which is provided on the side of the casing 1 facing away from the valve 3, and which accommodates the forward end 12 of the spring 2 with little play so that the casing 1 is prevented from getting displaced laterally. The forward end 12 of the spring 2 is further provided with a hole 18, with a flow channel, which extends through the casing 1 from the recess 1 to the recess 20, ending behind that hole. There can further be seen a fitting piece 21, a sealing ring 22 and an internally threaded bush 23 intended for mounting the valve 3 on a rim, as well as a screw cap 24 intended to close the outer end of the valve 3.

Figure 20:
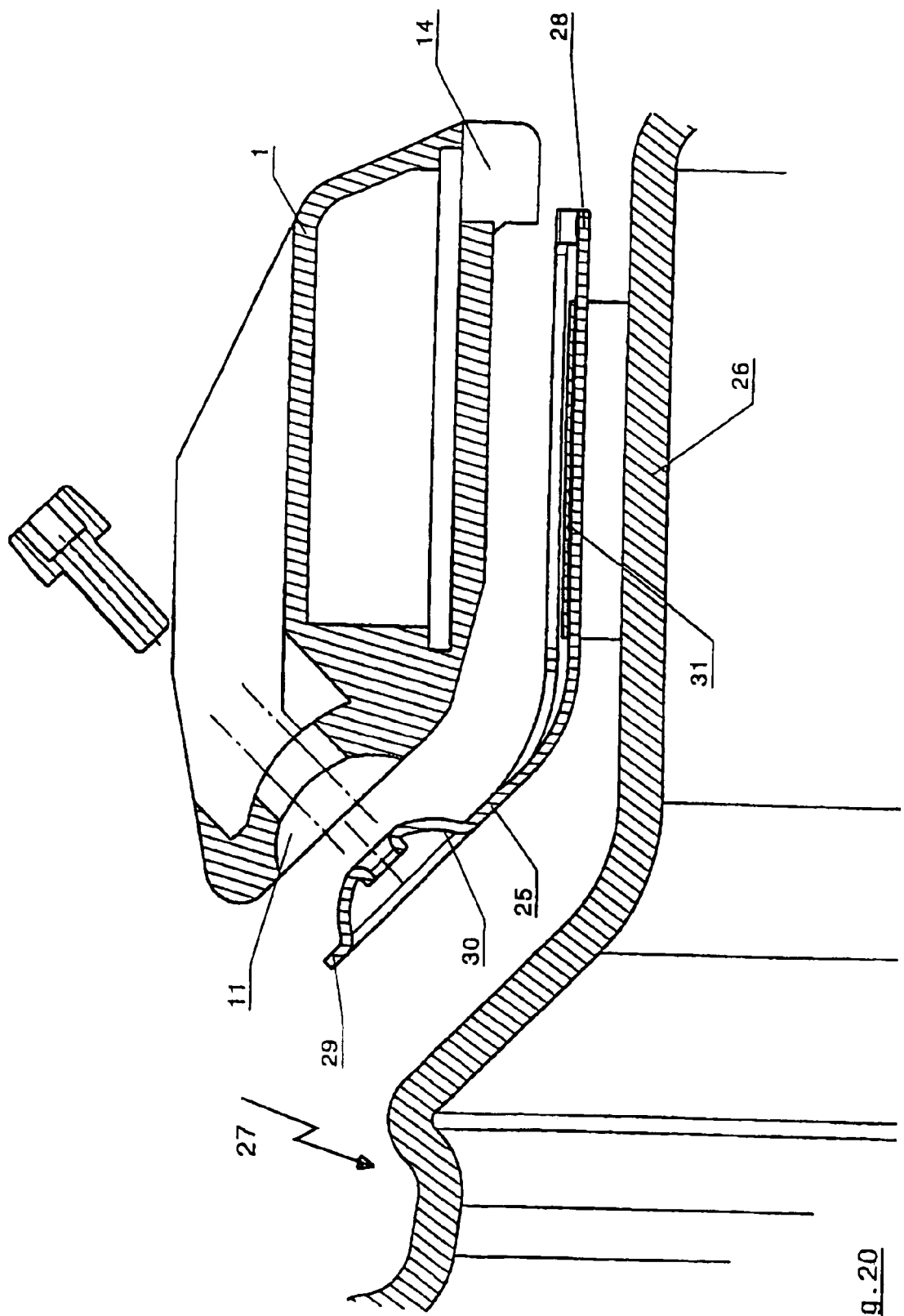
FIG. 20 shows a section along line A—A in FIG. 19.

While the embodiments illustrated in FIGS. 1 to 18 are especially well suited for deep-well rims, the fourth embodiment illustrated in FIGS. 19 to 21 is especially well suited for flat-base rims. In this case, the holder is not constituted by a valve, but rather by a separate sheet-metal part 25 having one portion 28, which is in contact with the base 26 of the rim 27, and one portion 29, arranged at an angle to, or bent off from the before-mentioned portion, which projects obliquely from the base 26 and comprises a convex shaped projection 30 intended to engage a corresponding concave shaped recess 11 in the casing 1. The convex projection 30 and the concave recess 11 preferably exhibit calotte-shaped surfaces. The projection 30 has a similar design as the valve base in the preceding examples so that a spring 2 can be held on it, which spring might be configured like the spring in the first example, or else like the spring in the second or in the third example.

In order to mount the holder 25 on the rim 27, the portion 28 of the holder 25 is configured as a double loop through which a tightening strap 31 can be passed. The tightening strap 31 is then wrapped about the well 26 of the rim and is tightly tensioned, whereby the portion 28 is firmly pulled against the rim well 26.

What is claimed is:

1. An arrangement comprising:
    a device for measuring the tire pressure in a pneumatic tire, which device is enclosed in a casing which is located inside the pneumatic tire when the pneumatic tire has been mounted on a wheel,
    a spring acting resiliently upon the casing, and a holder for the spring, the holder to be fixed on the wheel, the arrangement being characterized in that the spring and the casing are so designed and adapted one to the other that the casing finds support on the holder and is clamped for this purpose between the spring and the holder.

2. The arrangement as defined in claim 1, characterized in that the wheel has a rim with a well and that the spring is so designed and arranged as to push or pull the casing additionally against the rim well.

3. The arrangement as defined in claim 1, characterized in that the casing is held positively as well as under the spring action between the holder and the spring.

4. The arrangement as defined in claim 1, characterized in that the casing is provided with a recess for receiving a portion of the holder.

5. The arrangement as defined in claim 1, characterized in that the holder has a convex end portion.

6. The arrangement as defined in claim 5, characterized in that the casing is provided with a concave recess matching the convex end portion of the holder.

7. The arrangement as defined in claim 5 in which the end portion of the holder is in the form of a calotte.

8. The arrangement as defined in claim 1, characterized in that the spring is a leaf spring.

9. The arrangement as defined in claim 1, characterized in that an annular groove is provided on the holder and the spring is provided with a fork which can be inserted into said groove.

10. The arrangement as defined in claim 1, characterized in that a screw is screwed into that end of the holder on which the casing is supported, that one end of the spring is provided with a fork or with a hole, and that said end of the spring is clamped between the head of the screw and the end of the holder.

11. The arrangement as defined in claim 1, characterized in that the spring comprises a stirrup which is received by the casing in receiving means centrally arranged in the casing.

12. The arrangement as defined in claim 11, characterized in that the casing is mirror-symmetrical relative to the central receiving means.

13. The arrangement as defined in claim 11 in which the receiving means is a shallow groove.

14. The arrangement as defined in claim 1, characterized in that the spring comprises two mutually parallel stirrups connected by a common connecting element for mounting at the holder, and that the casing is provided with two parallel receiving means for receiving the two stirrups.

15. The arrangement as defined in claim 14, characterized in that the receiving means are arranged in symmetry relative to the center plane of the casing, which center plane contains a longitudinal axis of the holder.

16. The arrangement as defined in claim 14 in which the receiving means are two shallow grooves.

17. The arrangement as defined in claim 1, characterized in that the underside of the casing is provided with two feet, which project from the underside and which are located on different sides of the center plane of the casing, which center plane contains a longitudinal axis of the holder.

18. The arrangement as defined in claim 1, characterized in that the holder is constituted by a valve with a valve base which is located inside the pneumatic tire when the valve has been mounted on a wheel.

19. The arrangement as defined in claim 1, characterized in that the casing is traversed by a flow channel (17) for air, with the valve opening into that channel.

20. The arrangement as defined in claim 1, characterized in that the wheel has a rim with a well and that the holder is fixed on the rim by means of a tightening strap which embraces the rim well.

21. The arrangement as defined in claim 20, characterized in that the holder has a first portion in contact with the rim well and a second portion projecting from the rim well, the casing being clamped against said second portion.

22. The arrangement as defined in claim 20, characterized in that a loop is formed on the holder through which the tightening strap is passed.

23. A wheel for motor vehicles with pneumatic tires comprising
    a rim,
    a well formed in the rim, the base of which is delimited by a sidewall extending at an angle relative to the axis of rotation of the rim,
    a device for measuring the tire pressure in the pneumatic tyre, which device is located in a casing,
    a spring, and a holder for the spring, said holder is to be mounted on the wheel, the spring acting upon the casing so that the casing finds support on the base of the rim well,
    characterized in that the spring and the casing are so designed and adapted one to the other that the casing finds support on the holder and is clamped for this purpose between the spring and the holder.

24. The wheel as defined in claim 23, characterized in that the casing is supported by the holder and by the base of the rim well, only.

25. The wheel as defined in claim 24, characterized in that the casing is provided with two feet which find support on the base of the rim well.

* * * * *